A. LARSON & J. JACOBSEN.
MACHINE FOR INSERTING TAPE BUSHINGS IN PIANO ACTIONS.
APPLICATION FILED JUNE 23, 1911.

1,041,820.

Patented Oct. 22, 1912.

A. LARSON & J. JACOBSEN.
MACHINE FOR INSERTING TAPE BUSHINGS IN PIANO ACTIONS.
APPLICATION FILED JUNE 23, 1911.

1,041,820.

Patented Oct. 22, 1912.

UNITED STATES PATENT OFFICE.

ADOLPH LARSON AND JACOB JACOBSEN, OF ROCKFORD, ILLINOIS.

MACHINE FOR INSERTING TAPE BUSHINGS IN PIANO-ACTIONS.

1,041,820.   Specification of Letters Patent.   Patented Oct. 22, 1912.

Application filed June 23, 1911. Serial No. 634,997.

*To all whom it may concern:*

Be it known that we, ADOLPH LARSON and JACOB JACOBSEN, citizens of the United States, residing at Rockford, in the county of Winnebago and State of Illinois, have invented certain new and useful Improvements in Machines for Inserting Tape Bushings in Piano-Actions, of which the following is a specification.

The object of this invention is to automatically insert and secure tape bushings in various parts of piano actions, for instance in flanges, files, dampers, wippens, bulls and tongues.

In the accompanying drawings.

Our improvements are supported in this instance upon a table 1 supported by legs 2. To the table is secured a shelf 3, and to the shelf is fixedly connected a plate 4, and a plate 5 movable in the guide-ways 6.

Figure 4:
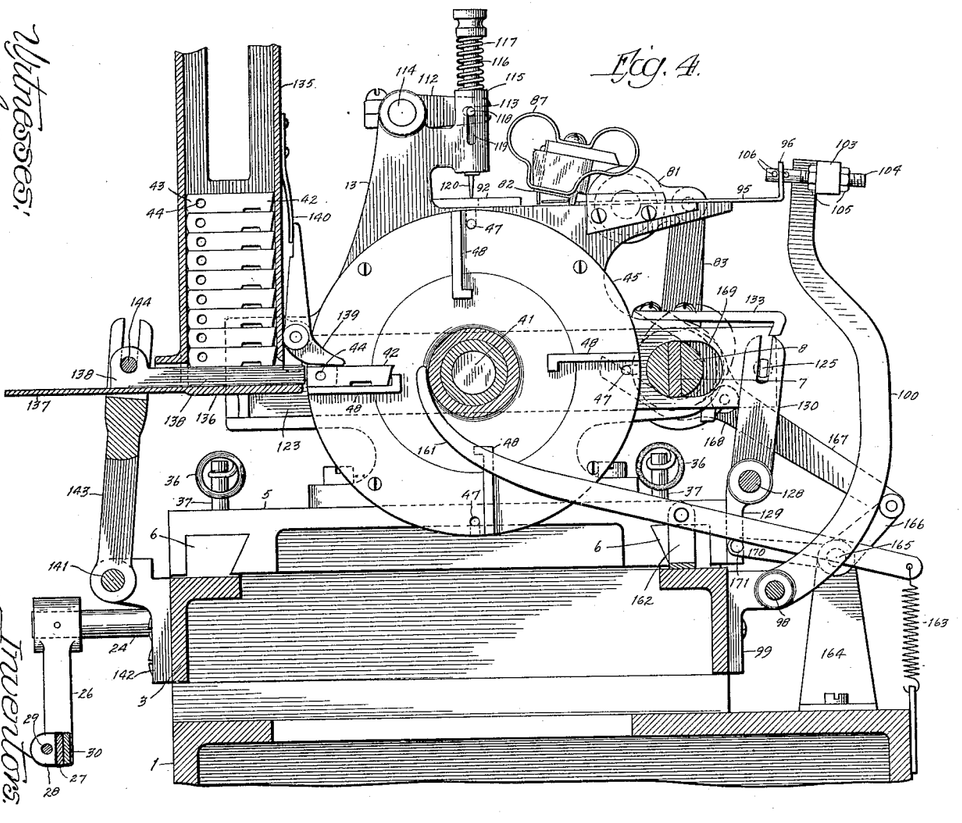
Fig. 4 is a transverse section on line $b\ b$ Fig. 2.
Figure 5:
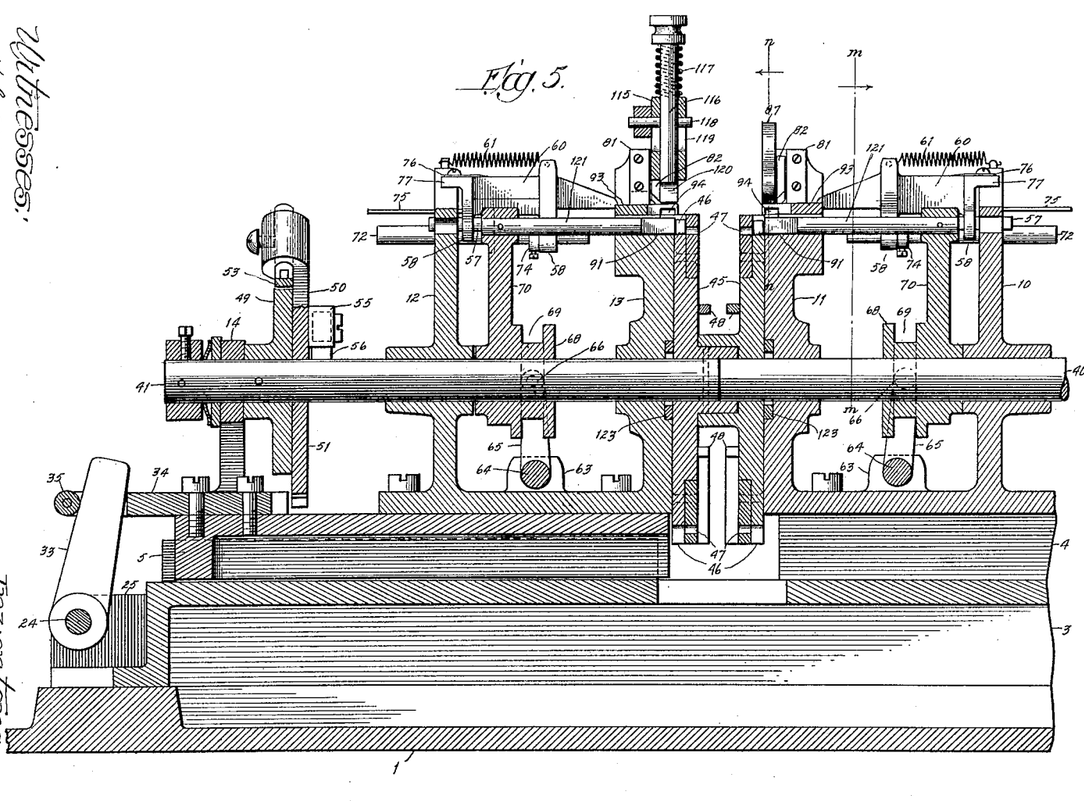
Fig. 5 is a section on line $c\ c$ Fig. 2.

A main driving shaft is in two sections 7 and 8 which have a sliding connection at their center ends by the slot and tongue as shown at Fig. 4.

The shaft section 7 is supported in a bracket 9 secured to the table 1, and two brackets 10 and 11 secured to the stationary plate 4. The shaft section 8 is supported in brackets 13 and 14 secured to the movable plate 5. The slidable connection between the two shaft sections 7 and 8 permit the plate 5 to be moved toward and from the stationary plate 4, at the same time allowing of an engagement of the shaft sections. To the shaft section 7 is secured a driving pulley 15 which is rotated by the belt 16 connected with a prime mover, and upon the rotation of the pulley 15 both shaft sections will be rotated. To the shaft section 7 is secured a cam 17. A rock-shaft 18 is supported in bearings 19, and to one end of this rock-shaft is secured an uprising arm 20 with which the cam 17 engages, thereby imparting an oscillatory movement to the rock-shaft. To the other end of this rock-shaft 18 is secured a crank 21, to the free end of which is pivotally connected a bar 22 having a laterally perforated bent end 23.

A rock-shaft 24 is supported in bearings 25, and to one end is secured a crank 26. To the free end of this crank is pivotally connected a bar 27 having a laterally perforated bent end 28. The ends 23 and 28 of the bars 22 and 27 respectively are connected by a bolt 29. The bars 22 and 27 are connected to a bar 30 by the screws 31, and the bars 22 and 27 are provided with holes 32 so as to permit of lengthwise adjustment of the bars 22 and 27 in connection with each other, and the bolt 29 serves to tighten the bars after adjustment.

To the rock-shaft 24 is secured an arm 33. To the movable plate 5 is secured a forked bar 34 supporting a roller 35 at its free end. The upwardly extending end of the bar 33 is located between the forks of the bar 34 and in contact with the roller 35. The cam 17 will impart a movement to the movable plate 5 in one direction through the connections described, and the coil springs 36 having one end connected to the pin 37 extending upwardly from the movable plate 5 and their other ends connected to the pins 38 extending upwardly from the stationary plate 4 will move the movable plate 5 toward the stationary plate 4.

The bearings 10 and 11 and 39 support a shaft 40, and the bearings 12, 13 and 14 support a shaft 41. These two shafts are in line and each is intermittently rotated.

Figures 1, 23, 24:
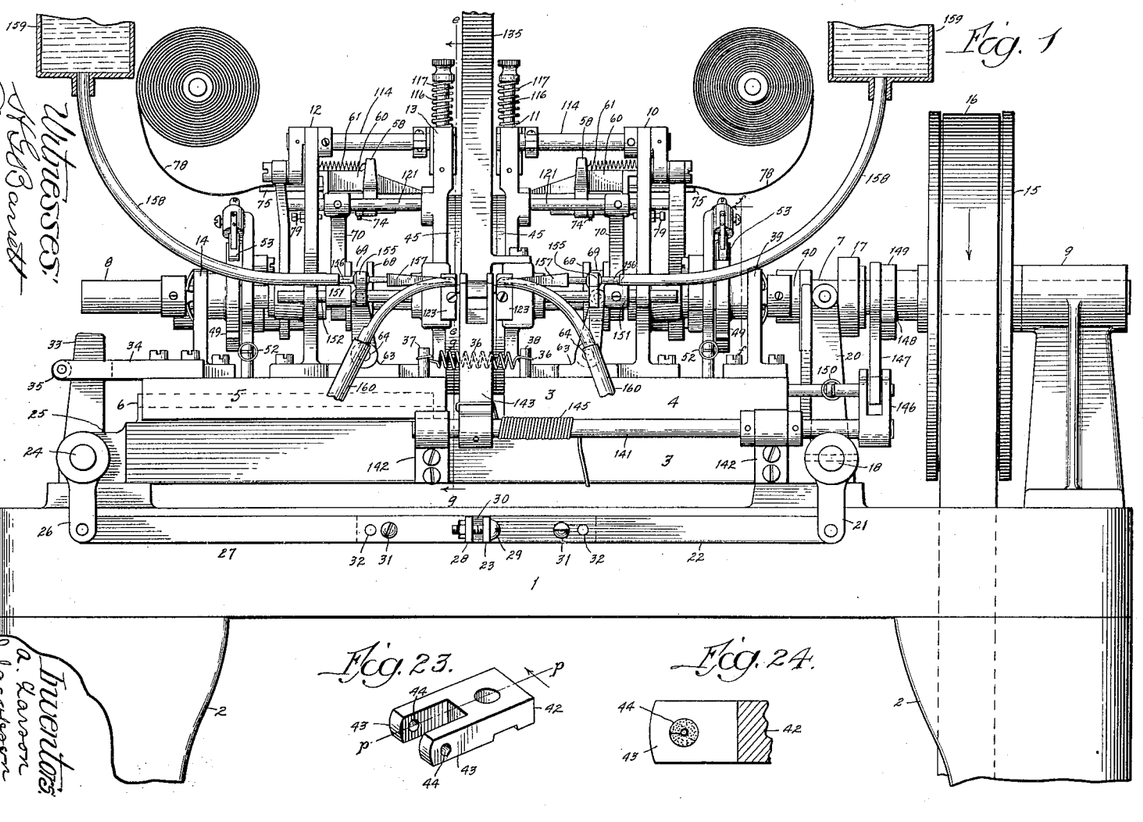
Figure 1 is a front elevation.
Fig. 23 is a perspective view of a flange without the tape bushings.
Fig. 24 is a section on line $p\ p$ Fig. 23, but in which a bushing has been applied.
Figure 2:
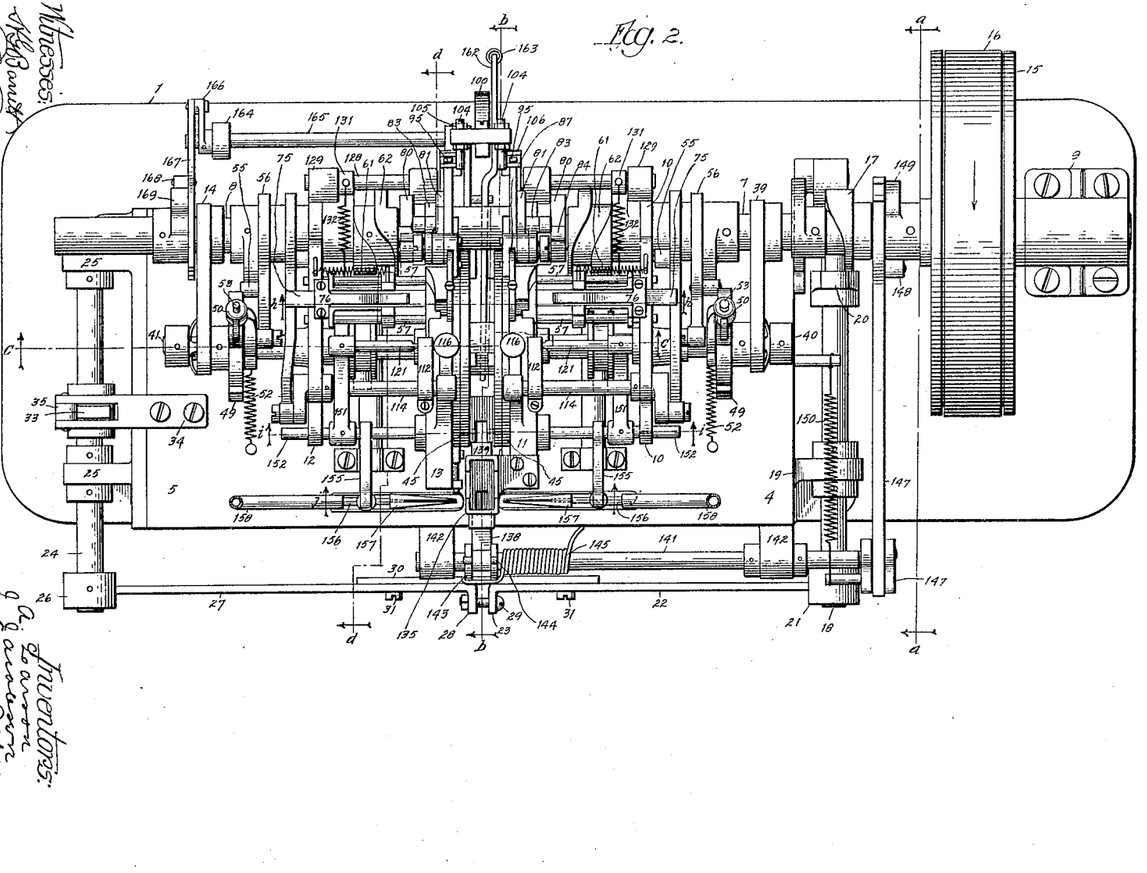
Fig. 2 is a plan view.
Figure 3:
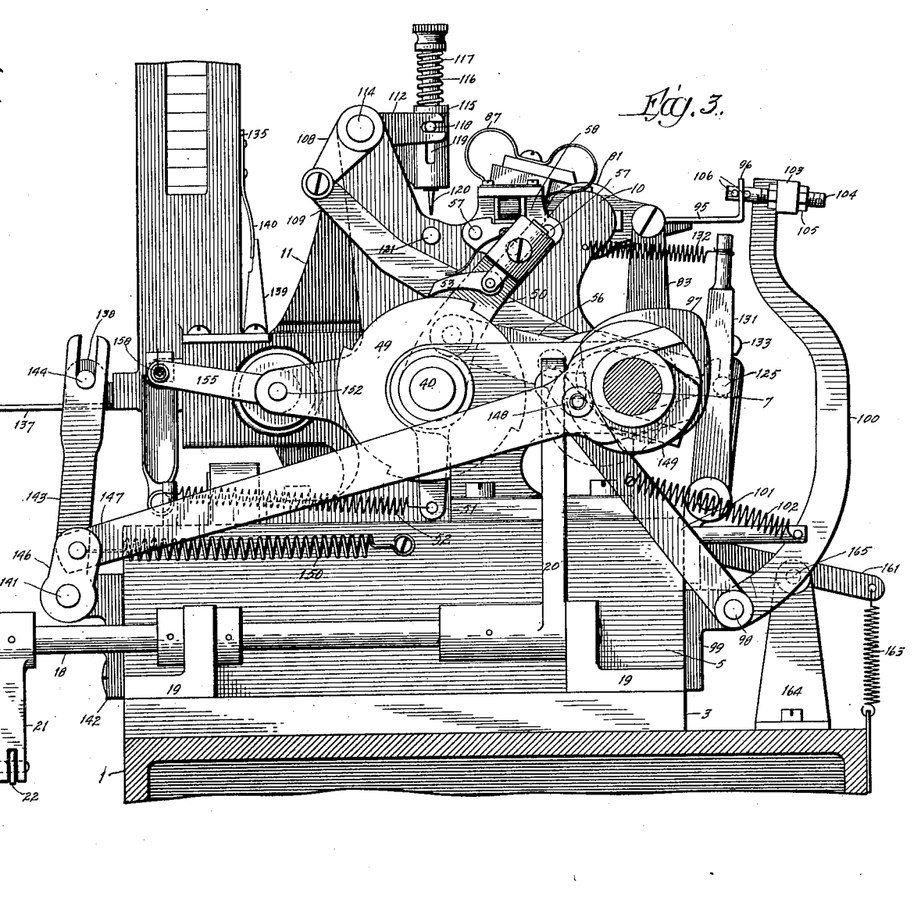
Fig. 3 is a transverse section on line $a\ a$ Fig. 2.

At Figs. 23 and 24 are shown the flange of a piano action, and comprises the main section 42, and the forks 43, formed with transverse holes 44.

As our improvements are designed to place a felt bushing in the holes in each of the forks of the flange, it is necessary to duplicate the mechanism, therefore the same reference numerals will be employed for both sets of mechanism. One set of mechanism is supported by the stationary plate 4 and the other set is supported by the movable plate 5, and as the plate 5 moves toward and from the plate 4, the mechanism carried thereby will also be moved.

To each of the shafts 40 and 41 is secured a disk head 45, each provided with a plurality of open-ended slots 46, and a plurality of peripheral circular openings 47 coinciding with the slots. The said slots 46 constitute in effect, sections or parts of die mechanism, as hereinafter explained. The inner faces of the heads are provided with laterally extending rests 48 for the flanges into which the tape bushings are placed.

Figure 8:
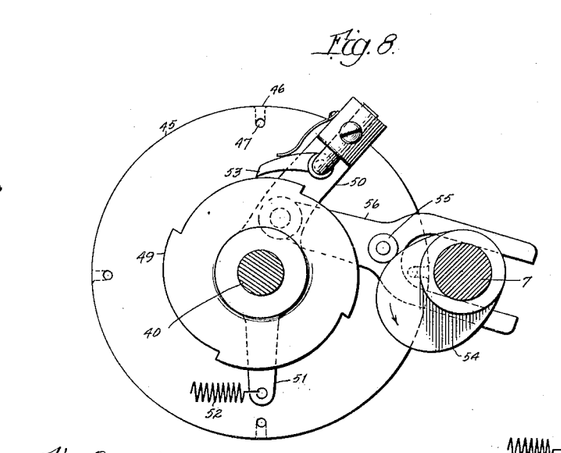
Fig. 8 is a transverse section on line $f\ f$ Fig. 1.

An intermittent rotary movement is imparted to each of the shafts 40 and 41 in unison, and is accomplished by a ratchet wheel 49 secured to the shaft. A bar 50 is pivotally mounted on a shaft, and has a depending extension 51 to which is connected a spring 52, the other end of the spring is connected to a fixed point. A dog 53 is supported by the bar 50 and engages the ratchet wheel 49. To each of the shaft sections 7 and 8 is connected a cam 54 which engages a roller 55 carried by the bar 56 which has a pivotal connection with the bar 50 and has its other end forked (Fig. 8) and guided by the shaft sections.

The rotary movement of the shaft sections 7 and 8, will through the mechanism described impart an intermittent rotary movement to the heads 45, and their periods of rest will locate one of the rests 48 of each head in a horizontal position at the front of the machine as shown at Fig. 4.

Figure 6:
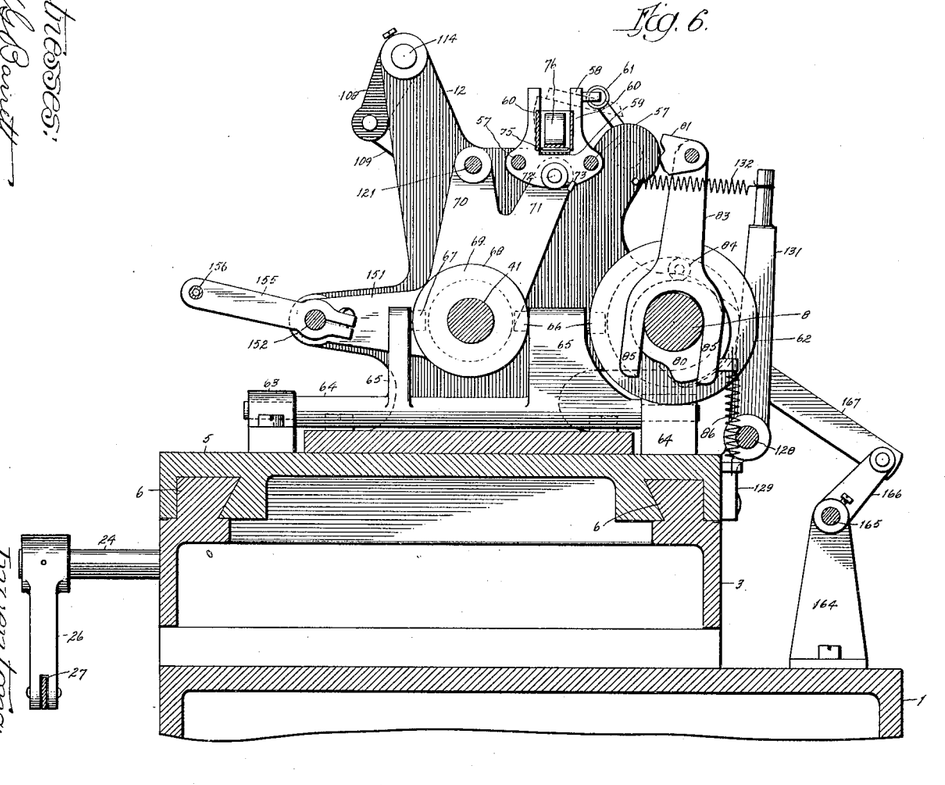
Fig. 6 is a section on line $d\ d$ Fig. 2.
Figure 11:
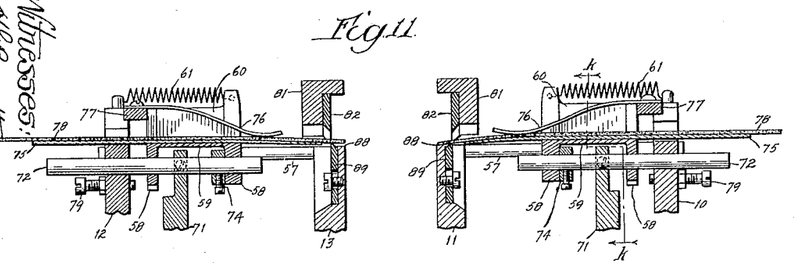
Fig. 11 is a section on line $h\ h$ Fig. 2.

The tape feeding mechanism is shown in Figs. 6 and 11, and comprises the two rods 57 which are supported by the brackets 10 and 11 of plate 4, and by the brackets 12 and 13 of plate 5. These rods support a carrier having the ends 58, bottom 59 and sides 60. A spring 61 has one end connected to one of the ends 58, and its other end connected to the brackets 10 and 12, and the action of this spring is to hold the head yieldingly in its movement on the rods 57 away from the head 45. A cam 62 is connected to each of the shaft sections 7 and 8.

Bearings 63 support a rock-shaft 64 having upwardly extending branches 65, one of which supports a double ended pin 66, and the other a single ended pin 67, Fig. 6.

On each of the shafts 40 and 41 is slidably mounted a collar 68 with a peripheral slot 69. The pin 67 and one end of pin 66 are located in the groove 69. From the collar 68 extends an arm comprising the two brackets 70 and 71. The branch 71 is connected to a rod 72 by the screw 73. This rod 72 is supported by the ends 58 of the slidable head and also passes through the bearings 10 and 12. To the rod 72 is adjustably connected a collar 74. A plate 75 is fixedly connected to the bottom 59, and a flat spring 76 has one end connected to a bar 77 forming a part of the head. The free end of this spring rests in contact with the plate 75 when a tape 78 is not located between them.

The rotary movement of the cam 62 will impart a reciprocating movement to the head carrying the plate 75 and spring 76 by the upper end of the branch 71 engaging the collar 74, moving the head in one direction, and engaging the other end 58 of the head, thereby moving the head in the opposite direction. As there is considerable movement of the branch 71 without moving the head, the head will have a period of rest at each end of its movement. The movement of this head toward the head 45 carried by the shafts 40 and 41 will be to carry the tape 78 with it, but in the return movement of the head, the tape will be held by a presser-bar so that the head will move along the tape and receive a new hold or bite on it, and the movement of the head is the length of the piece which is cut off. The screw 79 forms a stop to the outward movement of the head, in order that it may return the same distance each movement.

The office of the branch 70 will be described in connection with the plunger for moving a folded cut tape into an opening 47 in the head 45.

Figures 19, 20, 22:
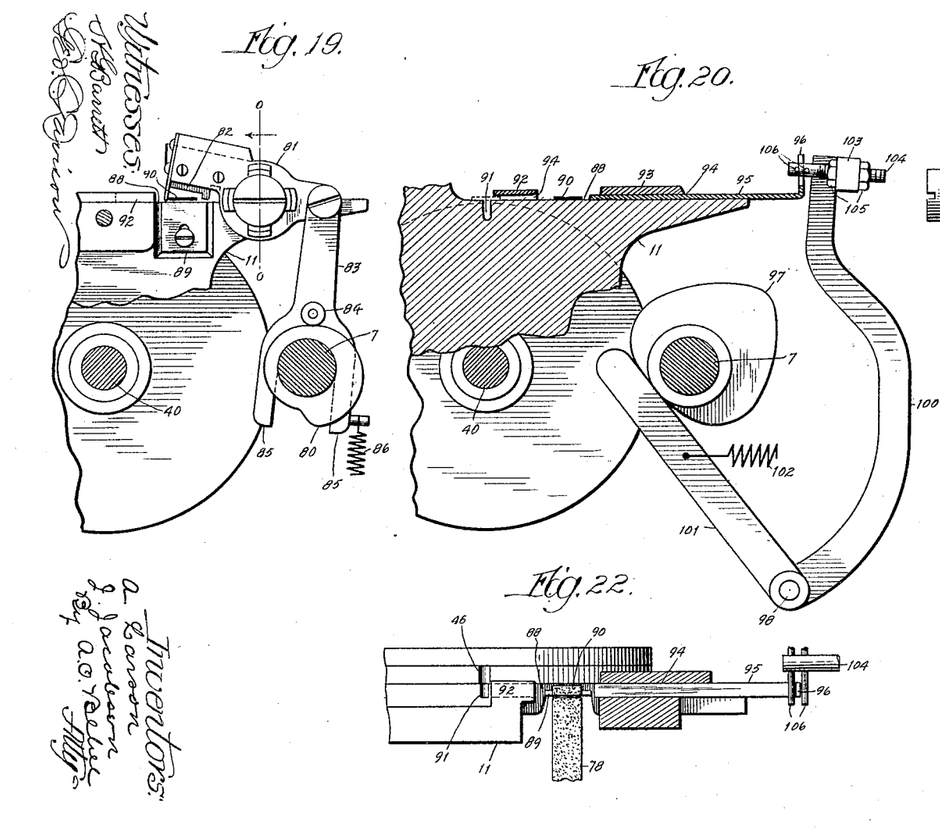
Fig. 19 is a section on line $m\ m$ Fig. 5.
Fig. 20 is a section on line $n\ n$ Fig. 5.
Fig. 22 is a plan view of Fig. 20 being partly in section.
Figure 21:
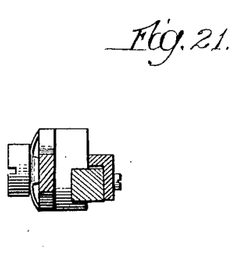
Fig. 21 is a section on line $o\ o$ Fig. 19.

The knife and the means for operating it comprises the cams 80, Fig. 19, connected to the shaft sections 7 and 8. A rocker-bar 81 supports a knife 82 at one end, and to its other end is pivotally connected a bar 83 supporting a roller 84 with which the cam contacts. This bar is held from lateral movement by branches 85 spanning the shafts 7 or 8. A spring 86 connected to one of the branches 85 serves to hold the roller 84 in contact with the cam 80. To the rocker-bar 81 is secured a spring presser bar 87 which is located alongside of the knife 82. The upper face 88 of the brackets 11 and 12 beneath the knife 82 is formed flat, and adjacent to this face is secured a knife 89, and this knife is located beneath the knife 82, but to one side thereof so that the two knives act in conjunction to sever the tape. The tape is fed between the knives and as the movable knife 82 descends, the spring presser-bar 87 will press down on the tape and hold it, while the tape feeding mechanism is withdrawing to receive a new hold, and hold the tape while the knives are severing it, and the severed piece will be like that represented at 90.

Figures 7, 10:
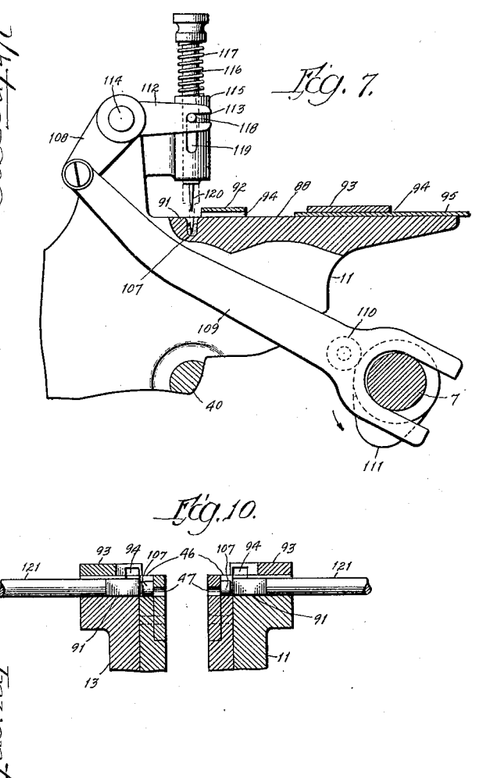
Fig. 7 is a transverse section on line $e\ e$ Fig. 1.
Fig. 10 is a section on line $e\ e$ Fig. 2.

After a piece has been cut from the tape it will be moved over a recess 91 formed in each of the brackets 11 and 13, Fig. 7, and the mechanism for accomplishing this comprises plates 92 and 93 beneath which are formed openings or passage-ways 94. The recesses 91 also constitute die portions or sections.

Figures 12, 13, 15, 16, 17, 18:
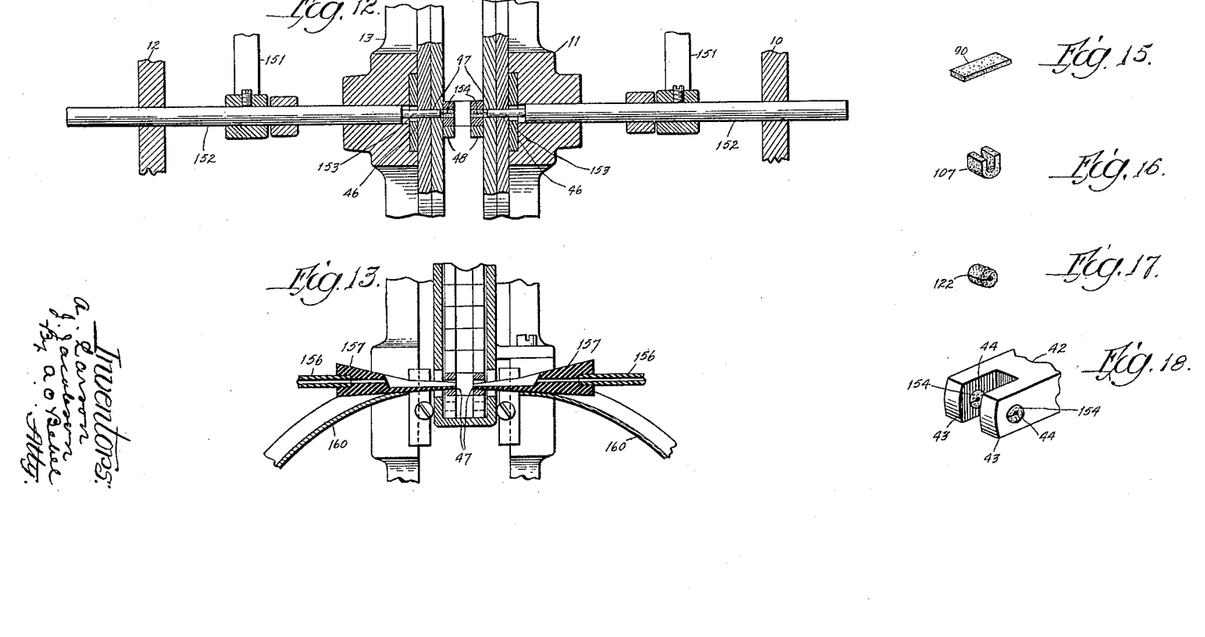
Fig. 12 is a section on line $i\ i$ Fig. 2.
Fig. 13 is a section on line $j\ j$ Fig. 2.
Fig. 15 is a perspective view of a cut bushing in its flat form.
Fig. 16 is a perspective view of a folded bushing.
Fig. 17 is a perspective view of a complete bushing.
Fig. 18 is a perspective view of one end of a flange showing the bushings in place.
Figure 14:
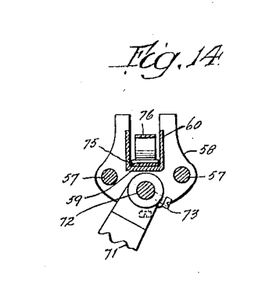
Fig. 14 is a section on line $k\ k$ Fig. 11.

In the space 94 beneath the plate 93 is located a flat plunger 95 having an upturned end 96. To the shaft section 7 is secured a cam 97, Fig. 20. A rod 98 is supported in brackets 99 connected to the base of the machine. To this rod is connected two arms 100 and 101. The arm 101 bears against the cam 97, and a spring 102 holds this arm yieldingly against the cam. To the upper end of the bar 100 is secured a cross-bar 103 which supports two screws 104 adjustable lengthwise by the nuts 105, and each screw supports two pins 106. The pins 106 receive the upturned end of the plunger 95. As the cam 97 rotates, it will reciprocate plungers 95 beneath the plates 92 and 93, which will move a cut section 90 of the tape from between the knives over the recess 91 as shown in Fig. 20. After the cut section of tape 90 has been moved over the recess 91, means are employed to fold or tuck it in the form shown at 107, Fig. 16.

The means for producing the fold comprises a rock shaft 114, supported by the brackets 10, 11, 12 and 13, to which is fixedly connected a crank 108, to the free end of which is pivoted an arm 109 which is guided by the shafts 7 and 8, and supporting a roller 110 which contacts with a cam 111 secured to the shafts 7 and 8. To the rock shaft 114 is fixedly connected an arm 112 formed with a slot 113. From the brackets 11 and 13 extend a tubular socket 115 within which is located a vertically movable plunger 116 and which is held elevated by the spring 117. A pin 118 is connected to the plunger and extends through a vertical slot 119 in the socket 115. The pin 118 is located in the slot 113 of the arm 112. The lower end 120 of the plunger is flattened in screw-driver form.

Figure 9:
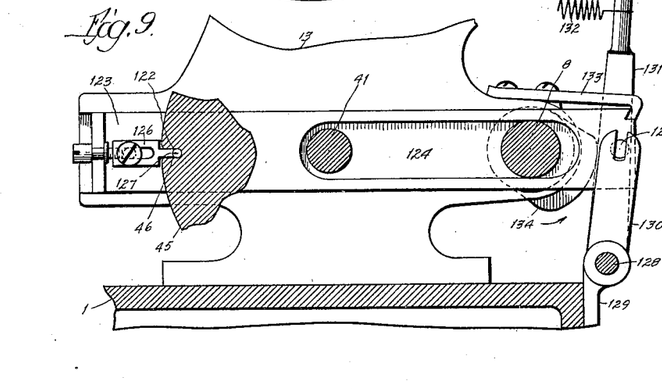
Fig. 9 is a section on line $g\ g$ Fig. 1.

As the cam 111 rotates, the arm 112 will be oscillated which will impart a vertical movement to the plunger 116, after the tape section 90 has been moved over the recess 91, the plunger will descend and fold it into the recess as shown at 107, Fig. 7. The next operation is to move the folded tape section 107 into a slot 46 of the head 45. The branch 70 of the arm carried by the collar 68 supports a plunger 121, which is guided in the brackets 11 and 13, and has its end flattened. This plunger is reciprocated by the movement of the collar 68 which will force the folded tape section 107 from the recess 91 into a slot 46 of the head 45. The next operation is to compress the folded tape section 107 in a cylindrical form shown at 122, Fig. 17. The mechanism for accomplishing this comprises the slide 123 which is movable in a guide-way in the brackets 11 and 13. This guide is provided with a lengthwise slot 124 to accommodate the shafts 7, 8, and 40 and 41. A stud 125 extends laterally from the guide near one end, and the other end of this guide supports a finger 126 having a semi-circular recessed end 127, Fig. 9. A rock shaft 128 is supported in brackets 129, and to it is fixedly connected an uprising forked arm 130 which receives the stud 125. Another arm 131 is fixedly connected to the rock shaft 128, and a spring 132 connects this arm with a fixed part of the frame.

A hook 133 is supported by the brackets 11 and 13, with which the slide may contact. A cam 134 is supported by each of the shaft sections 7 and 8, and upon being rotated contacts with the arm 131, thereby moving the slide in one direction, and the spring 132 moving the slide in the opposite direction. The movement of the slide by the cam will move the finger against the folded tape section and form it into cylindrical form 122, Fig. 9.

A magazine 135 for holding the flanges 42 is rectangular in cross-section and is supported by the bracket 11. The lower end 136 of the magazine has an extension 137 upon which is located a plunger 138 movable through the magazine. A presser foot 139 is supported at the inner edge of the magazine, and a spring 140 holds the presser foot down in a yielding manner. The plunger 138 is reciprocated through the magazine, and this movement is accomplished by the rock shaft 141 supported in bearings 142. To this rock shaft is fixedly connected an uprising arm 143 which is slotted and receives a pin 144 extending from the plunger 138. A spring 145 is coiled around the rock shaft 141, one end engaging the arm 143, and the other end resting against the frame of the machine. The action of this spring is to hold the plunger in its outward position by operating through the arm 143. To the rock shaft 141 is secured an arm 146 to which is pivotally connected a bar 147 which supports a roller 148 near its other end. The free end of the bar 147 is forked and receives the shaft section 8. A cam 149 is secured to the shaft section 8 against which the roller 148 contacts. A spring 150 has one end connected to the arm 146 and its other end connected to a stationary part of the frame. This spring holds the roller 148 in contact with the cam 149.

As the cam 149 rotates, the plunger 138 will be withdrawn, and the spring 145 will move the plunger inward. In the inward movement of the plunger, a flange 42 will be moved beneath the presser-bar 139 onto one of the rests 48 which will locate the holes 44 of a flange in line with one of the holes 47 in the heads 45. When a flange is thus located, a cylindrical tape section 122 is forced from one of the slots 46 through one of the holes 47 of each of the heads 45 into the holes 44 of the flange. This is accomplished by an arm 151 extending from the collar 62 and supporting a plunger 152. This plunger has a reduced end 153, a diameter equal to the diameter of the cylindrical tape section 122. The movement of the collar 68 will move the plunger 152 and force the tape from the head 45 into a hole 44 in the flange when it will appear as at 154.

The tape 78 is prepared with glue on one face and hardened, and if the holes in the flanges are moistened before the cylindrical tape section is forced therein, the glue will be softened and secure the tape section within a hole in the flange. This moistening is accomplished before the flanges are moved from the magazine, and the means employed comprise an arm 155 secured to and movable with the plunger 152, and the free end of this arm supports a tube 156 to one end of which is connected a tubular rubber tip 157. A rubber tube 158 connects the tube 156 with the water supply tank 159. A water waste pipe 160 is located beneath the rubber tip 157. Just before the bottom flange in the magazine is moved in connection with the intermittently rotated head 45, the rubber tip is moved into the hole 44 in the flange, thereby moistening the walls thereof. When the flange is being moved on a rest 48 of the two heads 45, the head carried by the movable section has been moved toward the other head in order that the two rest sections may be brought nearer together to clamp a flange between them, and after the cylindrical tape section has been placed in a hole in the flange, the head carried by the movable section is separated some distance from the other head, in order that the flange may be liberated.

To insure the discharge of the flange after having received the tape sections a discharge finger 161 is pivoted to a bracket 162, and a spring 163 has one end connected to the finger and its other end is connected to a stationary support.

Brackets 164 extend upward from the frame and support a rock shaft 165, to which is connected an arm 166, to the free end of which is pivoted an arm 167 supporting a roller 168. The free end of the arm 167 is slotted and receives the shaft section 7. A cam 169 is secured to the shaft section 7, and rotates in contact with the roller 168. Another arm 170 is secured to the rod 165 and supports a roller 171 at its free end which rests against the under edge of the discharge finger 161.

As the came 169 rotates, the arm 170 will be rocked upward, which will depress the free end of the discharge finger, bringing it in contact with the flange, thereby forcing it downward.

As the operations of the mechanisms have been fully described in connection with the construction it will not be necessary to further describe them, other than to say that the tape is fed in under the knife. A section or blank is cut off and is moved over the die section 91 beneath the folder. The blank is then folded by being forced downwardly into the die section 91. This folded blank is thereupon moved lengthwise into one of the die sections 46 of the intermittently rotated head, where it is formed into a cylindrical bushing. In the meantime, the holes in a flange have been moistened and the flange moved to a position to receive this cylindrical bushing, which is then moved into one of the moistened holes of said flange, after which the flange is discharged from the machine. These operations are all automatically performed, and no waste of tape is occasioned, as the section cut from the main roll of tape is just sufficient when placed in a hole in the flange to fill it.

We claim as our invention.

1. In apparatus of the character set forth, the combination with a die having an open sided and open ended die channel, of means entering the die to deposit a bushing blank in the channel, other means entering the open side to form said blank into a bushing, and means for moving the bushing longitudinally in the channel.

2. In apparatus of the character set forth, the combination with a die having an open sided and open ended die channel, of a plunger that enters the die channel to deposit a bushing blank in the channel, means for moving the deposited blank longitudinally in the channel, and a finger entering the open side to form said introduced blank into a bushing.

3. In apparatus of the character set forth, the combination with a die having a channel provided with an open side, of means entering the die channel to deposit a bushing blank therein, means for shifting the deposited die longitudinally in the channel, other means entering the open side to form said blank into a bushing, and mechanism for effecting the successive actions of said depositing and forming means.

4. In apparatus of the character set forth, the combination with a rotatable die member having a plurality of open-sided and open-ended die channels, of a plunger that successively enters the bushing blanks through the open ends into the channels, a finger that successively enters the open sides of the dies to form the introduced blanks into bushings, means for effecting a step-bystep rotation of the die member, and means for operating the plunger and finger when the die member is at rest.

5. In apparatus of the character set forth, the combination with a rotary die member having a plurality of open-ended die channels, that have sides opening through the periphery of said member, of a reciprocating plunger at one point for introducing blanks successively into the die channels through their open ends, a reciprocating forming finger successively entering the die channels at another point, a power shaft, ratchet mechanism driven by the power shaft for effecting a step-by-step rotation of the die member, and mechanism driven by the power shaft for effecting the movements of the plunger and finger when the die member is at rest.

6. In apparatus of the character set forth, the combination with relatively movable die members, each having open-ended and open sided die channels that aline, means entering the open side of the channel of one member for depositing and particularly forming a bushing blank therein, means for transferring the deposited blank through the adjacent open ends into the channel of the other member, and means for forming the blank into a complete bushing in the channel of said other member.

7. In apparatus of the character set forth, the combination with a fixed die member having an open-sided and open-ended die channel, of a rotary die member having a plurality of open-ended and open-sided die channels that successively aline with the die channel of the fixed member, a plunger that periodically enters the channel of the fixed member for depositing bushing blanks therein, means for successively moving said blanks through the open end of the said channel into the channels of the rotary member, means that successively enter the open sides of the channels of the rotary members for forming the blanks into bushings and means for expelling the formed bushings from the channels of the rotary member.

8. In apparatus of the character set forth, the combination with a rotatable die member having a plurality of dies opening through the periphery thereof, of means for effecting a step by step rotation of the die member, a cutter for severing blanks from a strip, a plunger for successively moving the severed blanks to a position over the open sides of the dies, another plunger that moves into and out of the dies for moving the positioned blanks thereinto, a finger moving into and out of the dies at a different point for forming the introduced blanks into bushings, and automatic mechanism for driving the die member, the two plungers and the finger.

9. In apparatus of the character set forth, the combination with means for introducing bushings successively into the bushing-receiving sockets of articles, of means for successively delivering the articles to a position to receive the bushings, and means for successively moistening the socket walls of each bushing just prior to its delivery to said position.

10. In apparatus of the character set forth, the combination with means for introducing bushings into the bushing-receiving sockets of articles, of means for intermittently and periodically delivering the articles to a position to receive the bushings by said introducing means, and automatic means for moistening the sockets of the articles prior to their said delivery and during the period of rest of the delivering means.

11. In apparatus of the character set forth, the combination with means for introducing a bushing into the bushing-receiving socket of an article, of means movable with the introducing means toward and from the article for moistening the socket walls.

12. In apparatus of the character set forth, the combination with means for introducing bushings successively into the bushing receiving sockets of articles, of means for successively delivering the articles to a position to receive the bushings, and means movable with the introducing means for successively moistening the socket walls of a preceding article when the bushing is being inserted into one of said articles.

13. In apparatus of the character set forth, the combination with means for moistening socket walls of an article to be bushed, of means for introducing a bushing into such sockets, and means for moving an article from the moistening means to the bushing introducing means.

14. In apparatus of the character set forth, the combination with means for moistening the socket walls of articles to be bushed, of means for introducing bushings into such sockets, means for moving articles successively from the moistening means to the bushing-introducing means, and mechanism for effecting the movements of the moistening means and bushing means toward and from the said articles.

15. In apparatus of the character set forth, the combination with a movable fluid delivery pipe for moistening the socket walls of an article to be bushed, of a movable plunger for inserting a bushing into the socket, and connections between the pipe and plunger for effecting their simultaneous movement.

16. In apparatus of the character set forth, the combination with a movable article carrier, of a magazine for articles to be bushed, means for delivering articles from the magazine to the movable carrier, means for moistening the bushing receiving sockets of the articles while in the magazine, and means coöperating with the carrier for introducing bushings into the moistened sockets of articles delivered thereto.

17. In apparatus of the character set forth, the combination with a rotatable article carrier having a plurality of article supports, of a magazine located alongside the carrier, a fluid delivery pipe movable toward and from the magazine for delivering a moistening agent to the sockets of the articles while in the magazine, a plunger movable toward and from the article carrier to introduce bushings into the articles placed on said carrier, means for moving the moistened articles from the magazine to the carrier, means for effecting a step by step movement of the carrier, and means for moving the fluid pipe and plunger.

18. In apparatus of the character set forth, the combination with a movable carrier having a plurality of article supports, of means for intermittently moving the carrier, a device mounted independently of the carrier for successively clamping articles on the support, means other than the carrier for successively introducing articles between the supports and the clamping device, and means for introducing bushings into the articles while so clamped.

19. In apparatus of the character set forth, the combination with a movable carrier having a plurality of article supports, of means for intermittently moving the carrier, a device mounted independently of the carrier for successively clamping articles on the support, means other than the carrier and located at one side of the same for successively introducing articles between the supports and the clamping device while the carrier is substantially stationary, and means located at a different side of the carrier for introducing bushings into the articles while so clamped.

20. In apparatus of the character set forth, the combination with movable means for forming and holding a bushing, of mechanism for moving said holding means to a position to deliver the bushing to an article, and means for transferring the bushing so formed from the forming and holding means to said article.

21. In apparatus of the character set forth, the combination with a movable combined bushing forming die and article support, of means for introducing a bushing in the die, means for moving the combined die and support to a position to receive an article to be bushed, and means for expelling the bushing from the die into an article placed on the combined die and support.

22. In apparatus of the character set forth, the combination with a movable combined bushing forming die and article support, of means for forming a bushing in the die, means for moving the combined die and support to a position to receive an article to be bushed, mechanism for delivering an article thereto when so positioned, and means for expelling the bushing from the die into an article placed on the combined die and support.

23. In apparatus of the character set forth, the combination with a rotatable member having a bushing forming die and an article support, of means for forming a bushing in the die, means for delivering an article on to the support, and means for moving the bushing from the die into the article.

24. In apparatus of the character set forth, the combination with a rotatable member having a plurality of bushing forming dies, and a plurality of article supports located adjacent thereto, of means for successively introducing bushing blanks into the dies, means for forming the bushings in said dies, means for successively placing articles to be bushed on the supports, and means for expelling the bushings from the dies into the articles.

25. In apparatus of the character set forth, the combination with an article support comprising relatively movable heads arranged to clamp an article between them, of means for effecting the relative movement of the heads, and means on opposite sides of the head for introducing bushings into opposite sides of an article clamped between the heads.

26. In apparatus of the character set forth, the combination with a rotatable article support comprising rotatable heads having a relative movement toward and from each other, of means for effecting the rotation and relative movement of the heads, and means for introducing a bushing into an article clamped between the heads.

27. In apparatus of the character set forth, the combination with spaced rotatable heads having a relative movement toward and from each other and having a plurality of article supports, of means for relatively moving the heads to clamp articles placed between them on the supports, means for successively introducing articles to be bushed between the heads, means for introducing bushings into the articles placed between the heads, and means for intermittently rotating the heads.

28. In apparatus of the character set forth, the combination with a rotary member comprising spaced heads that are relatively movable toward and from each other, of means for introducing articles between the heads, means for forming bushings, and devices for introducing said bushings into the articles placed between the heads.

29. In apparatus of the character set forth, the combination with spaced heads having means for supporting articles to be bushed between them, of means for introducing bushings in opposite directions into the articles so placed.

30. In apparatus of the character set forth, the combination with article-supporting means, of mechanisms operating in opposite directions to simultaneously introduce bushings in opposite directions into articles supported thereon.

31. In apparatus of the character set forth, the combination with spaced heads having means for supporting articles to be bushed between them, of bushing holding means carried by the heads, and means for ejecting the bushings from said holding means in opposite directions into articles placed between the heads.

32. In apparatus of the character set forth, the combination with spaced rotatable heads having a plurality of article supports, of devices located alongside the heads for successively ejecting sets of bushings from said heads into articles placed between them.

33. In apparatus of the character set forth, the combination with spaced rotatable heads capable of relative movement toward and from each other, said heads having bushing receiving sockets and article supports arranged on their opposing sides, of means for effecting an intermittent rotation of the heads, means for intermittently moving the heads toward and from each other to clamp the articles placed therebetween, and plungers operating in the heads for expelling the bushings therefrom into the articles clamped between said heads.

34. In apparatus of the character set forth, the combination with spaced rotatable heads having bushing holding dies, said heads being relatively movable toward and from each other, of means for intermittently rotating the heads and effecting their said relative movements, means for introducing articles to be bushed between the heads at one point, means for expelling the bushings from the dies at the same point, and means for introducing the bushings into the dies at another point.

35. In apparatus of the character set forth, the combination with spaced rotatable heads capable of relative movement toward and from each other, said heads having open sided dies and article supports on their opposing faces, of means for introducing bushing blanks into the open sides of the dies, means successively entering said open sides for forming the blanks into complete bushings, an article magazine, means for delivering articles from the magazine on to the supports between the heads, and means for expelling the formed bushings from the dies into the articles placed upon the supports.

36. In apparatus of the character set forth, the combination with spaced heads having article holding means, of means for introducing articles between the heads on to the holding means, means for delivering bushings into the article so held, and a device projecting between the heads and separate therefrom for moving the articles from between the heads after said articles have been bushed.

37. In apparatus of the character set forth, the combination with open-ended and open-sided die sections, of means entering the open side of one section for introducing a bushing blank thereinto, means entering the open end of said section for transferring the blank to the other section, means entering the open side of said other section for completing the bushing therein, and means entering the open end of the latter section for expelling the bushing therefrom.

38. In apparatus of the character set forth, the combination with an open-sided and open-ended stationary die section, of means entering the open side of the same to introduce a bushing blank thereinto, a rotary open-sided and open-ended die section that alines with the stationary die section, means entering the open end of the stationary die section for expelling the blank into the rotary section, means entering the open side of the rotary die section for completing the bushing therein, means for presenting an article to be bushed to one of the open ends of the rotary die section, and means entering the other open end of the rotary die section for expelling the bushing therefrom into the article.

In testimony whereof we have hereunto set our hands in presence of two subscribing witnesses.

ADOLPH LARSON.
JACOB JACOBSEN.

Witnesses:
A. O. BEHEL,
BYRON E. EASTWOOD.

---

Copies of this patent may be obtained for five cents each, by addressing the "Commissioner of Patents, Washington, D. C."